US011861260B2

(12) United States Patent
Chen et al.

(10) Patent No.: US 11,861,260 B2
(45) Date of Patent: Jan. 2, 2024

(54) AUDIO CONTROL CIRCUIT, HOST DEVICE AND ASSOCIATED CONTROL METHOD

(71) Applicant: Realtek Semiconductor Corp., HsinChu (TW)

(72) Inventors: Ko-Wei Chen, HsinChu (TW); Chao-Wei Liu, HsinChu (TW); Cheng-Kai Liu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 330 days.

(21) Appl. No.: 17/506,666

(22) Filed: Oct. 20, 2021

(65) Prior Publication Data

US 2022/0317967 A1     Oct. 6, 2022

(30) Foreign Application Priority Data

Mar. 31, 2021    (TW) ................... 110111909

(51) Int. Cl.
*G06F 3/16*        (2006.01)
*G05B 15/02*     (2006.01)

(52) U.S. Cl.
CPC ............. *G06F 3/162* (2013.01); *G05B 15/02* (2013.01)

(58) Field of Classification Search
None
See application file for complete search history.

(56) References Cited

U.S. PATENT DOCUMENTS

| 9,032,132 B2 | 5/2015 | Jensen | |
| 2013/0290572 A1* | 10/2013 | Dalal | G06F 13/14 |
| | | | 710/19 |
| 2014/0268229 A1* | 9/2014 | Kempka | G06F 13/387 |
| | | | 358/1.15 |
| 2018/0322074 A1 | 11/2018 | Patil | |

FOREIGN PATENT DOCUMENTS

| CN | 102981989 A | 3/2013 |
| JP | 2009-193358 A | 8/2009 |
| JP | 2018-504714 A | 2/2018 |
| JP | 2018-32056 A | 3/2018 |
| JP | 2018-73392 A | 5/2018 |
| JP | 2019-207551 A | 12/2019 |
| KR | 10-2017-0096510 A | 8/2017 |
| KR | 10-2018-0110437 A | 10/2018 |
| WO | 2005/116845 A1 | 12/2005 |

* cited by examiner

*Primary Examiner* — Walter F Briney, III
(74) *Attorney, Agent, or Firm* — Winston Hsu

(57) ABSTRACT

The present invention provides an audio control circuit, wherein the audio control circuit includes a USB interface circuit, a specific interface circuit and a processing circuit. In the operation of the audio control circuit, the processing circuit receives a plurality of parameters from a host device through the specific interface circuit; and during an enumeration between the audio control circuit and the host device, the processing circuit uses the plurality of parameters to perform the enumeration.

10 Claims, 2 Drawing Sheets

AUDIO CONTROL CIRCUIT, HOST DEVICE AND ASSOCIATED CONTROL METHOD

BACKGROUND OF THE INVENTION

1. Field of the Invention

The present invention relates to an audio control circuit, and more particularly, to an audio control circuit having a universal serial bus (USB) interface.

2. Description of the Prior Art

In an audio control circuit using a USB interface, there are usually requirements for different customized parameters. Therefore, the audio control circuit may be additionally equipped with storage components to store various parameters for use of connection to a host device. However, storing various kinds of different parameters requires a large storage space, which will increase the cost of the storage components and the area of the printed circuit board.

SUMMARY OF THE INVENTION

One of the objectives of the present invention is to provide an audio control circuit capable of receiving a plurality of parameters from a host device, and using the plurality of parameters for performing an enumeration with the host device, to solve the aforementioned problem.

At least one embodiment of the present invention provides an audio control circuit comprising a universal serial bus (USB) interface circuit, a specific interface circuit and a processing circuit. The USB interface circuit is configured to connect to a host device. The specific interface circuit is configured to connect to the host device. The processing circuit is coupled to the USB interface circuit and the specific interface circuit. The processing circuit receives a plurality of parameters from the host device through the specific interface circuit, and during an enumeration between the audio control circuit and the host device through the USB interface circuit, the processing circuit uses the plurality of parameters to perform the enumeration with the host device.

At least one embodiment of the present invention provides a control method applicable to an audio control circuit comprising: receiving a plurality of parameters from a host device through a specific interface circuit; performing an enumeration with the host device through a universal serial bus (USB) interface circuit, wherein during the enumeration between the audio control circuit and the host device through the USB interface circuit, the plurality of parameters are used to perform the enumeration with the host device.

At least one embodiment of the present invention provides a host device comprising a universal serial bus (USB) interface circuit, a specific interface circuit and a core circuit. The USB interface circuit is configured to connect to an audio control circuit. The specific interface circuit is configured to connect to the audio control circuit. The core circuit is coupled to the USB interface circuit and the specific interface circuit. When the host device is powered on, the core circuit actively transmits a plurality of parameters to the audio control circuit through the specific interface circuit, and the plurality of parameters comprises contents that the audio control circuit has to transmit to the host device during an enumeration between the audio control circuit and the host device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
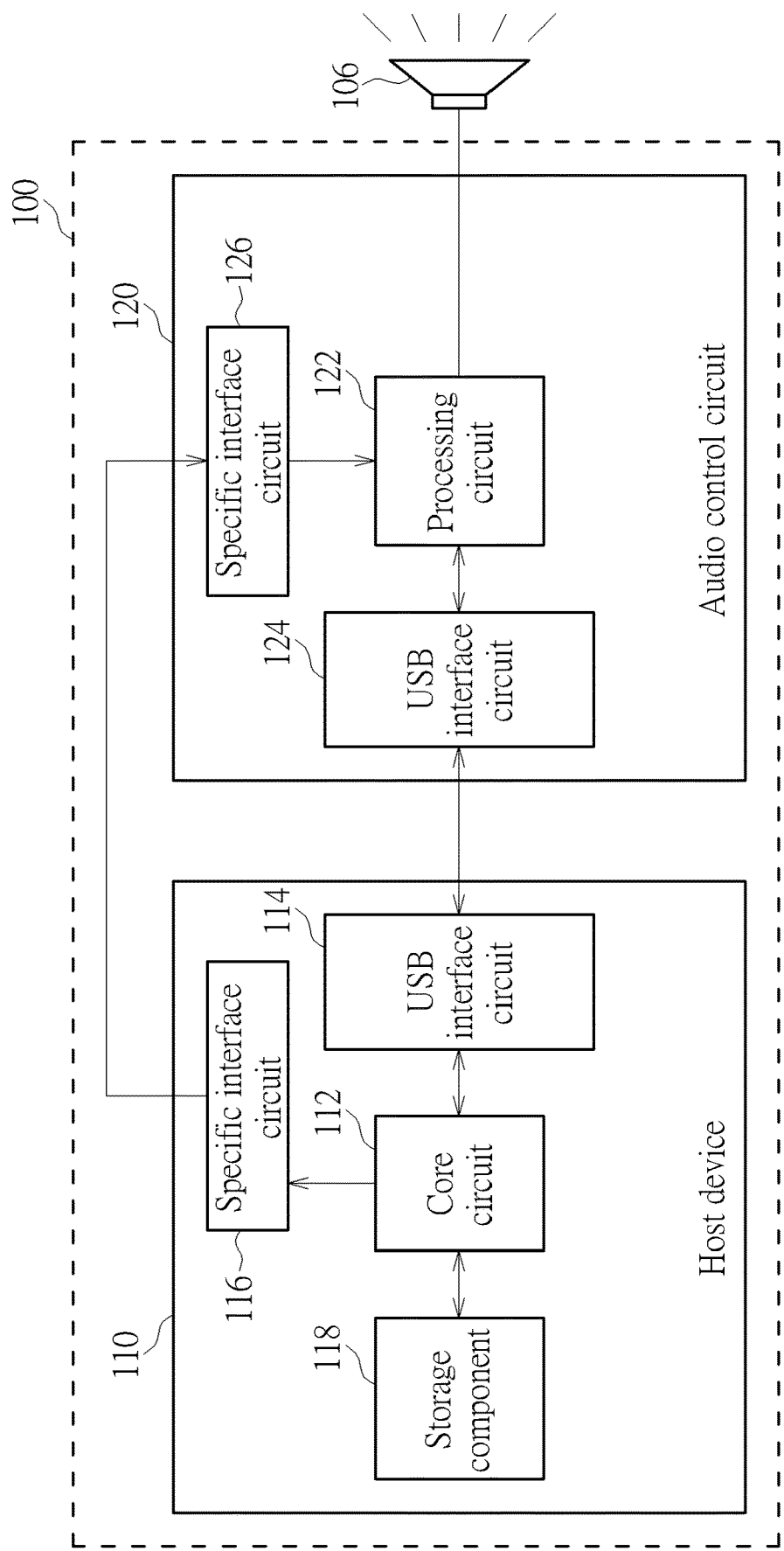
FIG. 1 is a diagram illustrating an electronic device according to an embodiment of the present invention.

FIG. 1 is a diagram illustrating an electronic device 100 according to an embodiment of the present invention. As shown in FIG. 1, the electronic device 100 comprises a host device 110 and an audio control circuit 120, where the host device 110 comprises a core circuit 112, a USB interface circuit 114, a specific interface circuit 116 and a storage component 118; and the audio control circuit 120 includes a processing circuit 122, a USB interface circuit 124 and a specific interface circuit 126. In the present embodiment, the electronic device 100 may be a personal computer, a laptop or any other electronic device with an audio playback function, and the audio control circuit 120 may be a built-in audio device on the motherboard, that is, the host device 110 and the audio control circuit 120 are made on one motherboard.

In one embodiment, the storage component 118 may be a flash memory, an electronically-erasable programmable read-only memory (EEPROM), an one time programmable read-only memory (OTPROM), or other types of non-volatile storage components. In addition, in the present embodiment, the storage component 118 is arranged in the host device 110. In another embodiment, the storage component 118 may be disposed outside the host device 110.

In the present embodiment, the host device 110 may be a processing chipset in the electronic device 100, which is connected to the USB interface circuit 124 of the audio control circuit 120 through the USB interface circuit 114. The host device 110 transmits an audio signal to the processing circuit 122 through the USB interface circuits 114 and 124 for related processing (such as encoding and decoding, etc.), and then generates an output audio signal to a speaker 106 for playing, where the speaker 106 may be external to the electronic device 100, or may be a built-in loudspeaker device of the electronic device 100.

In one embodiment, the specific interface circuit 116 of the host device 110 and the specific interface circuit 126 in the audio control circuit 120 conform to a specification of inter-integrated circuit (I2C) interface, a specification of serial peripheral interface or a specification of universal asynchronous receiver/transmitter (UART), but the present invention is not limited thereto. In other embodiments, as long as the specific interface circuit 116 of the host device 110 and the specific interface circuit 126 of the audio control circuit 120 can perform data transmission with each other, any suitable specifications other than the USB interface circuit can be adopted.

Regarding the operation of the electronic device 100, the electronic device 100 is first powered on to perform the initialization operation, and before the host device 110 recognizes a type of the audio control circuit 120 completely, the core circuit 112 obtains a plurality of parameters from the storage component 118 that can be used by the audio control circuit 120. For example, the plurality of parameters may include a number of supported configurations, a vender identification number (ID), a product ID, a sample rate, a volume range, etc. The plurality of parameters is transmitted to the audio control circuit 120 through the specific interface circuit 116, and the processing circuit 122 of the audio control circuit 120 receives the plurality of parameters through the specific interface circuit 126. Then, during an enumeration between the host device 110 and the audio control circuit 120, the audio control circuit 120 can use the plurality of parameters to communicate with the host device 110 to finish related settings. Specifically, during the enumeration, the host device 110 transmits USB packets to the audio control circuit 120 through the USB interface circuit 114 and allocates an address; then, the audio control circuit 120 reports to the host device 110 through the USB interface circuit 124 to inform that it is a device with an audio function, and sends relevant information to the host device 110 through the USB interface circuit 124, where the relevant information comprises the plurality of parameters that are previously received from the host device 110 through the specific interface circuit 126 and may include the number of supported configurations, the vender ID, the product ID, the sample rate, the volume range, etc.; in the end, the host device 110 recognizes the type of the audio control circuit 120 and transmits USB audio class (UAC) related packets to the audio control circuit 120, and ends the enumeration. It should be noted that, since the operation of the enumeration process is known to those skilled in the art and the focus of the embodiment is that the plurality of parameters used by the audio control circuit 120 in the enumeration come from the host device 110, the above description merely describes the main operations of the enumeration that are related to this embodiment, and other details of the enumeration are omitted here for brevity.

After the enumeration is finished, the host device 110 can transmit the audio data to the audio control circuit 120 through the USB interface circuit 114. The audio data is used by the processing circuit 122 to generate the output audio signal to the speaker 106 for playing.

In the embodiment of FIG. 1, the host device 110 actively transmits the plurality parameters that are used by the audio control circuit 120 in the enumeration through the specific interface circuit 116 when it is powered on. Therefore, the audio control circuit 120 itself does not need to be equipped with storage components to store the above-mentioned plurality of parameters, including the number of supported configurations, the vender ID, the product ID, the sample rate, the volume range, etc. In this way, the production cost of the audio control circuit 120 can be reduced. In addition, the host device 110 is a processing chipset and originally has the storage component 118 for storing program codes and other parameters. Therefore, storing the plurality of parameters used by the audio control circuit 120 into the storage component 118 does not increase much cost.

On the other hand, since the host device 110 actively provides the plurality parameters that are used by the audio control circuit 120 when it is powered on, the audio control circuit 120 does not actively retrieve the plurality of parameters, but passively receives the plurality of parameters.

Figure 2:
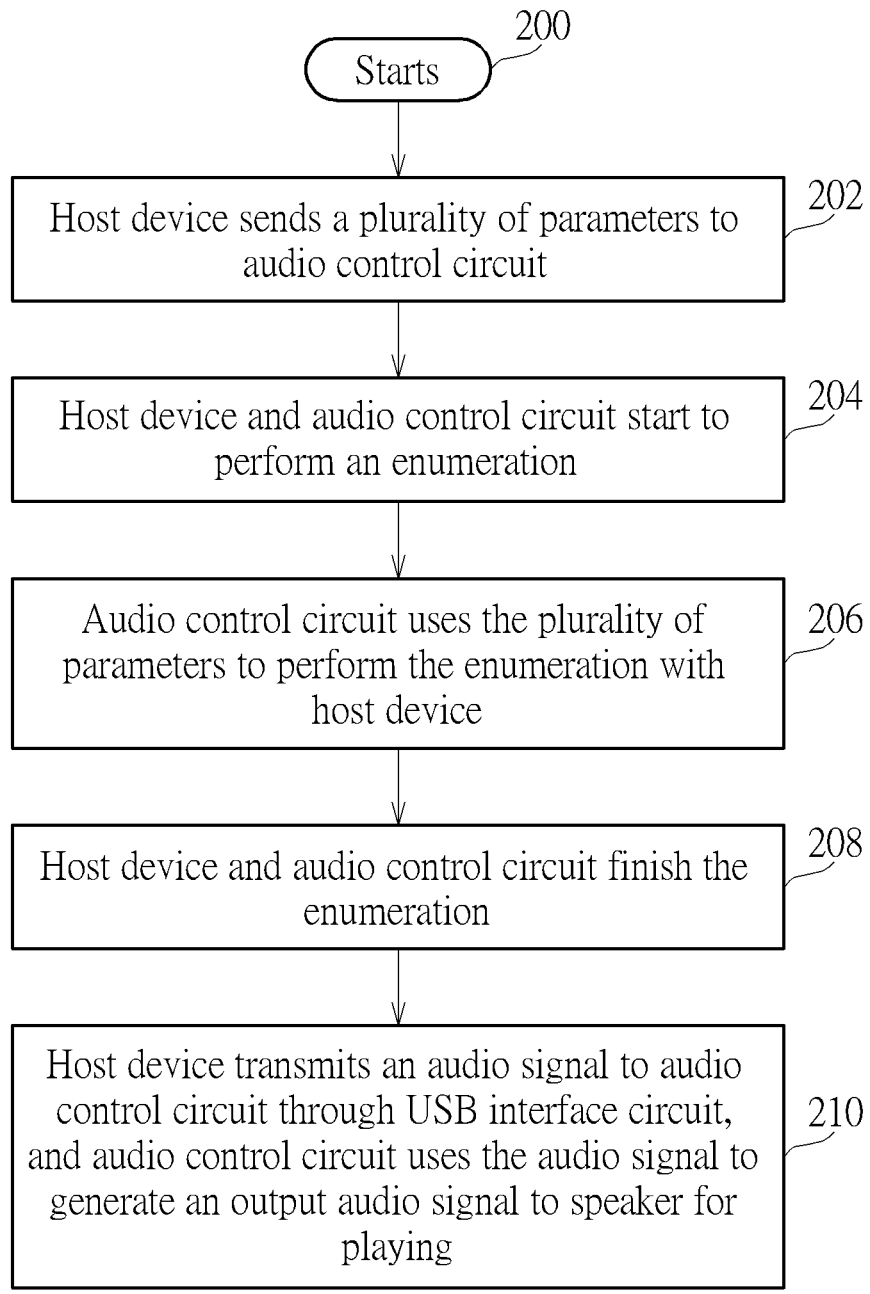
FIG. 2 is a flowchart illustrating a control method according to an embodiment of the present invention.

FIG. 2 is a flowchart illustrating a control method according to an embodiment of the present invention. With reference to the above embodiment, the flow is as follows.

Step 200: Flow starts.

Step 202: A host device sends a plurality of parameters to an audio control circuit.

Step 204: The host device and the audio control circuit start to perform an enumeration.

Step 206: The audio control circuit uses the plurality of parameters to perform the enumeration with the host device.

Step 208: The host device and the audio control circuit finish the enumeration.

Step 210: The host device transmits an audio signal to the audio control circuit through a USB interface circuit, and the audio control circuit uses the audio signal to generate an output audio signal to a speaker for playing.

Briefly summarizing the present invention, in the audio control circuit, the host device and the related control method of the present invention, the audio control circuit receives the plurality of parameters through the specific interface circuit during the boot process. The plurality of parameters are used for the subsequent enumeration between the USB interface circuit and the host device. Therefore, since the plurality of parameters that are used by the audio control circuit in the enumeration are provided by the host device, the audio control circuit does not need to be equipped with storage components to store these parameters, which reduces the cost of the audio control circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An audio control circuit, comprising:
a universal serial bus (USB) interface circuit, configured to connect to a host device;
a specific interface circuit, configured to connect to the host device; and
a processing circuit, coupled to the USB interface circuit and the specific interface circuit, wherein the processing circuit receives a plurality of parameters from the host device through the specific interface circuit, and during an enumeration between the audio control circuit and the host device through the USB interface circuit, the processing circuit uses the plurality of parameters to perform the enumeration with the host device.

2. The audio control circuit of claim 1, wherein after the audio control circuit is powered on and the host device does not recognize the audio control circuit yet, the processing circuit passively receives the plurality of parameters from the host device through the specific interface circuit.

3. The audio control circuit of claim 1, wherein the plurality of parameters comprise at least a portion of a number of supported configurations, a vender identification number (ID), a product ID, a sample rate and a volume range; and during the enumeration between the audio control circuit and the host device through the USB interface circuit, the processing circuit transmits contents of the plurality of parameters to the host device to perform the enumeration.

4. The audio control circuit of claim 1, wherein the specific interface circuit conforms to a specification of inter-integrated circuit (I2C) interface.

5. The audio control circuit of claim 1, wherein the specific interface circuit conforms to a specification of serial peripheral interface.

6. The audio control circuit of claim 1, wherein the specific interface circuit conforms to a specification of universal asynchronous receiver/transmitter (UART).

7. A control method applicable to an audio control circuit, comprising:

receiving a plurality of parameters from a host device through a specific interface circuit;

performing an enumeration with the host device through a universal serial bus (USB) interface circuit, wherein during the enumeration between the audio control circuit and the host device through the USB interface circuit, the plurality of parameters are used to perform the enumeration with the host device.

8. The control method of claim 7, wherein the plurality of parameters comprise at least a portion of a number of supported configurations, a vender identification number (ID), a product ID, a sample rate and a volume range; and performing the enumeration with the host device through the USB interface circuit comprises:

during the enumeration with the host device through the USB interface circuit, transmitting contents of the plurality of parameters to the host device to perform the enumeration.

9. The control method of claim 7, wherein the specific interface circuit conforms to a specification of inter-integrated circuit (I2C) interface, a specification of serial peripheral interface, or a specification of universal asynchronous receiver/transmitter (UART).

10. A host device, comprising:

a universal serial bus (USB) interface circuit, configured to connect to an audio control circuit;

a specific interface circuit, configured to connect to the audio control circuit; and a core circuit, coupled to the USB interface circuit and the specific interface circuit, wherein when the host device is powered on, the core circuit actively transmits a plurality of parameters to the audio control circuit through the specific interface circuit; and the plurality of parameters comprise contents that the audio control circuit has to transmit to the host device during an enumeration between the audio control circuit and the host device.

* * * * *